United States Patent [19]

Wilson

[11] Patent Number: 4,520,232

[45] Date of Patent: May 28, 1985

[54] POLYGRAPHIC ENCRYPTION-DECRYPTION SYSTEM

[76] Inventor: William J. Wilson, 1239 Blevins Gap Rd., Huntsville, Ala. 35802

[21] Appl. No.: 373,341

[22] Filed: Apr. 30, 1982

[51] Int. Cl.³ .............................................. H04L 9/04
[52] U.S. Cl. .............................. 178/22.05; 178/22.09; 178/22.19
[58] Field of Search ................ 178/22.05, 22.09, 22.19

[56] References Cited

U.S. PATENT DOCUMENTS

| Re. 30,957 | 6/1982 | Feistel | 178/22.19 |
|---|---|---|---|
| 3,962,539 | 6/1976 | Ehrsam et al. | 178/22.05 |
| 4,172,213 | 10/1979 | Barnes et al. | 178/22.19 |
| 4,195,200 | 3/1980 | Feistel | 178/22.19 |
| 4,229,818 | 10/1980 | Matyas et al. | 178/22.05 |
| 4,322,577 | 3/1982 | Brandstrom | 178/22.05 |
| 4,329,545 | 5/1982 | Westermayer | 178/22.19 |
| 4,343,967 | 8/1982 | McArdle | 178/22.19 |
| 4,447,672 | 5/1984 | Nakamura | 178/22.19 |

Primary Examiner—Sal Cangialosi
Attorney, Agent, or Firm—C. A. Phillips

[57] ABSTRACT

A system for encoding, or encrypting, digital data wherein an invertible matrix of binary bits provides the encrypting factor or key, this invertible matrix being loaded in a memory. Blocks or sets of binary bits of data, a string of serially appearing binary bits, to be encoded are sequentially loaded into discrete, ordered stages of an input shift register, and the state of each stage is coupled as an enabling signal to sets of gates which read out the binary states of rows of the matrix configured memory. Groups of outputs from gates, conforming to columns of the matrix memory, are fed to an exclusive OR gate for each group. Then, the outputs of the exclusively OR gates for several columns of the matrix are loaded into discrete stages of an output register. The combination of the states of the output register together provide a block or polygraphic encryption, or decryption, of the binary data supplied the input register. The states of the output register are then clocked out in serial form.

2 Claims, 2 Drawing Figures

POLYGRAPHIC ENCRYPTION-DECRYPTION SYSTEM

TECHNICAL FIELD

This invention relates generally to electronic systems for encrypting binary values or states, and particularly to a system of this character wherein a number of binary characters are to be encryption as a set or block, such system of encrypting being often referred to as polygraphic or block encryption systems.

BACKGROUND ART

There are many instances in the processing and transmission of binary data where it is desirable to translate a series or block of discrete binary bits ot data into a like numbered block or series of bits, but wherein at least certain of the binary states of the series must be translated to an opposite state in accordance with some reversible pattern of translation. In the past, block, or polygraphic encryption, has been incredibly complex, it has required a significant number of electronic operations, and has been both slow and costly as well as limited in key size (or space) and security. As a result, although it is a quite desirable type of encryption, it has not been widely used.

It is an object of this invention to provide a polygraphic or block system of binary data encryption and decryption which is both fast and inexpensive and at the same time provides significantly enhanced security over known polygraphic and block encryption systems.

SUMMARY OF THE INVENTION

In accordance with this invention, an electronic memory is loaded with a binary matrix of "0" or "1" signal states, and the rows and columns of the matrix are made up so that the matrix is an invertible matrix. This thus loaded memory becomes an encryption (or decryption) instrument or key. Binary data to be encrypted is fed to a temporary or buffer input memory which holds a set of binary bits to be encrypted, this memory having an equivalent number of bit holding stages to the square, row or column, size of the binary matrix loaded memory. The bit state of each location of the input memory is employed as an enable circuit which, corresponding to a pre-selected state, a 0 or 1, causes the binary states of row loadings of the matrix memory to be read out. Outputs of column loadings of the matrix memory so read out are fed to discrete exclusively OR gates (there being one for each column) which have outputs connected to discretely ordered stages of a buffer output memory. Since only those rows which are subject to an enabling binary state from the input memory provide outputs to the exclusively OR gates, the output memory is encrypted by an input memory determined selection of a combination of binary states derived from the matrix. The now encoded contents of the output memory are serially read out and may then be transmitted over an insecure communications channel to a receiving point where the encoded binary bits would be decrypted. Decryption is accomplished in the same manner as encryption, with the exception that the decryption matrix is the inverse of the encryption matrix. It is to be appreciated that the "row" and "column" terms as used herein may be reversed.

DETAILED DESCRIPTION OF THE DRAWINGS

Figure 1:
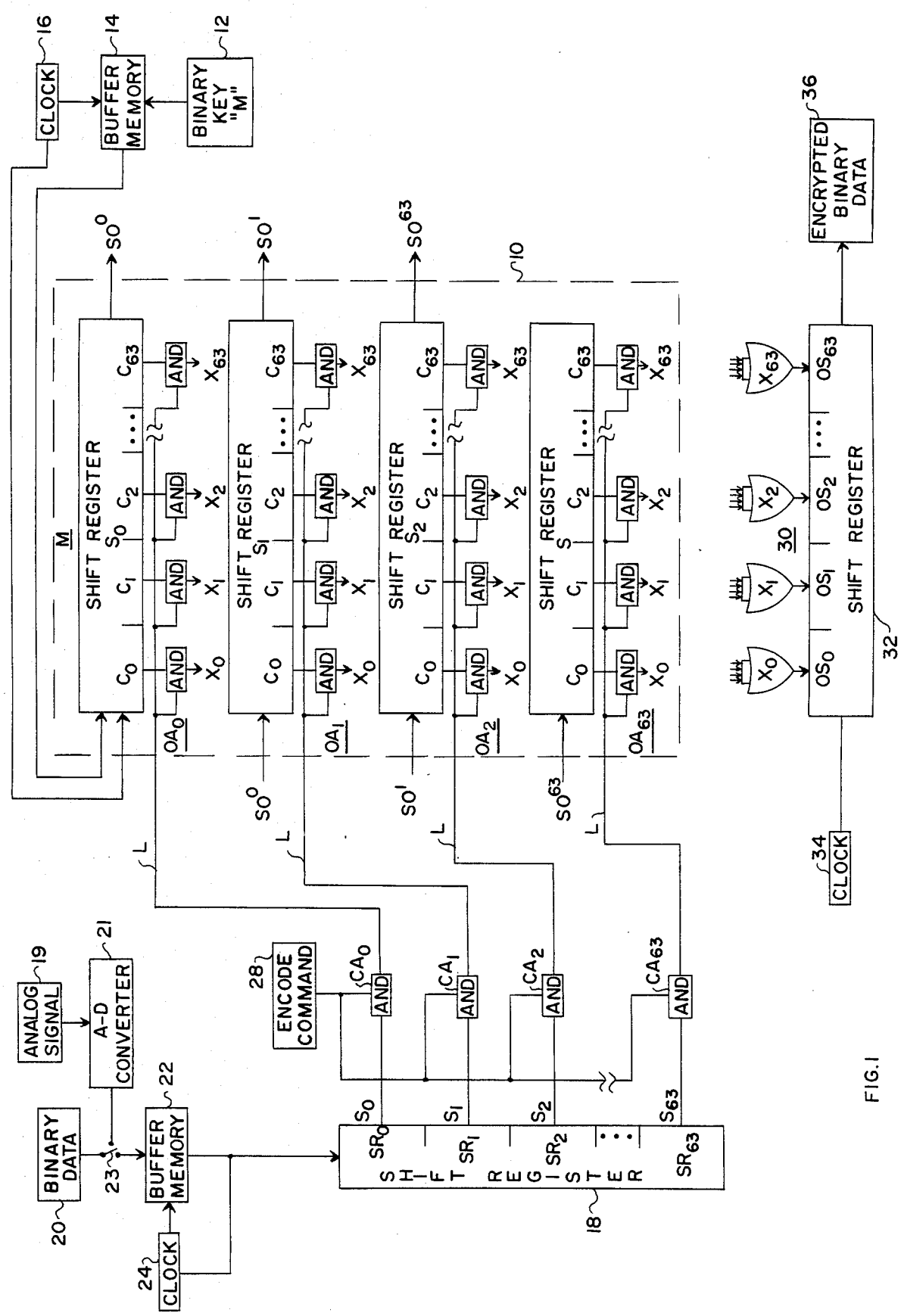
FIG. 1 is an electrical schematic block diagram of an embodiment of the invention.

Referring to the drawings, and initially to FIG. 1, a central memory 10 is provided in which is stored an encryption, or decryption, key in the form of a binary matrix. Significantly, no row of the matrix can be all zeroes, and the modulo 2 sum of any combination of rows cannot be equal to the binary number representative of any row. The same is true for columns. With these conditions met, the matrix has the characteristic of being invertible, or non-singular, a feature of this invention. In accordance with a matrix key, memory 10 is illustrated as being composed of shift registers wherein each shift register forms a row of a matrix, and like ordered stages of these shift registers may also be treated as columns of the matrix. As an example which produces an essentially unbreakable encryption, the matrix employed is a 64×64 bit binary matrix (a smaller number or larger number may be used, depending upon the degree of security desired), and, coordinately, memory 10 is formed of 64 shift registers $SO_0$–$SO_{63}$ for rows, and wherein each register has 64 binary signal storage stages or locations. Like ordered stages of the shift registers are deemed column locations of the matrix and are appropriately designated as $C_0$–$C_{63}$.

An invertible binary matrix key M, represented by the numeral 12, would be generated and recorded, as on a magnetic disc. Then, it would be loaded through an appropriate interface, such as buffer memory 14 and a clock source 16, into the shift registers of memory 10. For convenience of loading, typically the shift registers would be serially arranged to permit serial loading as by the interconnection of the last stage of each shift register to the first stage of the following shift register, this being illustrated by lead lines $SO^1$, $SO^2$, and $SO^{63}$.

Binary data is encrypted in succeeding blocks or sets of 64 binary bits, corresponding to the rank order of the binary matrix M. The bits are loaded into 64 bit input shift register 18 from some conventional source 20 of binary data, such as an electronic keyboard, computer, or memory. Alternately, the binary data would be derived from an analog data source 19, e.g., telemetry or speech, in which case the analog data would be converted to digital data by analog-to-digital (A-D) converter 21. Then, typically, the data would be fed from either binary data source 20 or A-D converter 21 through selector switch 23 to a buffer memory 22 and then be clocked into input shift register 18 by the introduction of clock pulses from clock pulse generator 24 to buffer memory 22 and to input shift register 18. When loaded, set outputs of shift register 18, labeled $S_0$–$S_{63}$ for the responsive stages of the shift register, would present "0" or "1" electrical outputs indicative of the binary state of each particular stage. Thus, there would appear 64 signal states, some of which would typically be a "0" state and some a "1" state. Conventional means would be provided to insure that each set of data supplied to input shift register 18 is complete and that the ordered position of each bit is accomplished. This is typically accomplished by means of parity checks or cyclic redundancy codes and by the use of counting devices, such as ring counters.

Each numbered "set" output of shift register 18 is employed such that when its output is a "1", it causes all stage set outputs of a discrete shift register of memory 10 to be provided as outputs. Thus, when there is a "1" state in the first or $SR_0$ stage of input shift register 18, the outputs of stages of a corresponding shift register of memory 10 are read out, and so on.

As a means of accomplishing readout of memory 10, the set output of each register of input shift register 18 is first fed to an input of a separate and discrete control AND gate of AND gates $CA_0$-$CA_{63}$. These AND gates are all enabled at the same time by a command logic signal from encode command control 28. When this occurs, the shift register outputs of shift register 18 are gated via control leads 25, 27, 29, and 31 to the enable inputs of the AND gates of memory 10 which control the readout of discrete stages of the shift registers of memory 10. There is one of these AND gates for each shift register, and accordingly, each set is labeled with one of the designations $OA_0$-$OA_{63}$.

It will be noted that the state output of a discrete stage of shift register 18 is employed to enable the AND gates of one of the AND gate sets $OA_0$-$OA_{63}$ bearing a like number to the shift register stage number of shift register 18. In this fashion, the state of a stage of shift register 18 gates out the output of one of shift registers $SO_0$-$SO_{63}$ of memory 10 when the state of that stage is of a selected or gating state, for example, a "1" state. In this manner, one row of the matrix of memory 10 appears as outputs $X_0$-$X_{63}$ of the AND gates. In instances where the state or stage of shift register 18 is a "0", then the corresponding control of AND gates $OA_0$-$OA_{63}$ are not enabled, and the outputs $X_0$-$X_{63}$ for a corresponding set of AND gates remains at a constant level, for example, a "0".

All like column outputs of shift registers of memory 10 are added modulo 2. Accordingly, all like numeral labeled outputs $X_0$-$X_{63}$ of the AND gates are fed to a like numerically designated exclusively OR gate of the set of exclusively OR gates 30. Thus, exclusively OR gates 30 are column oriented as to the matrix M of binary bits stored in memory 10. The resultant column oriented outputs of XOR (exclusively OR) gates $OG_0$-$OG_{63}$ are applied in a like numbered order to the set terminals of stage locations $OS_0$-$OS_{63}$ of output shift register 32, and in this manner, shift register 32 is loaded in parallel by these outputs. Thus, there would appear a like numbered order of binary states in shift register 32, and these represent, and are an encryption of, like numbered states of input shift register 18. The now encrypted binary states are read out in serial form by simply applying, from clock signal generator 34, clock pulses to the shift input of shift register 32, whereby they will appear serially as encrypted binary data 36.

Figure 2:
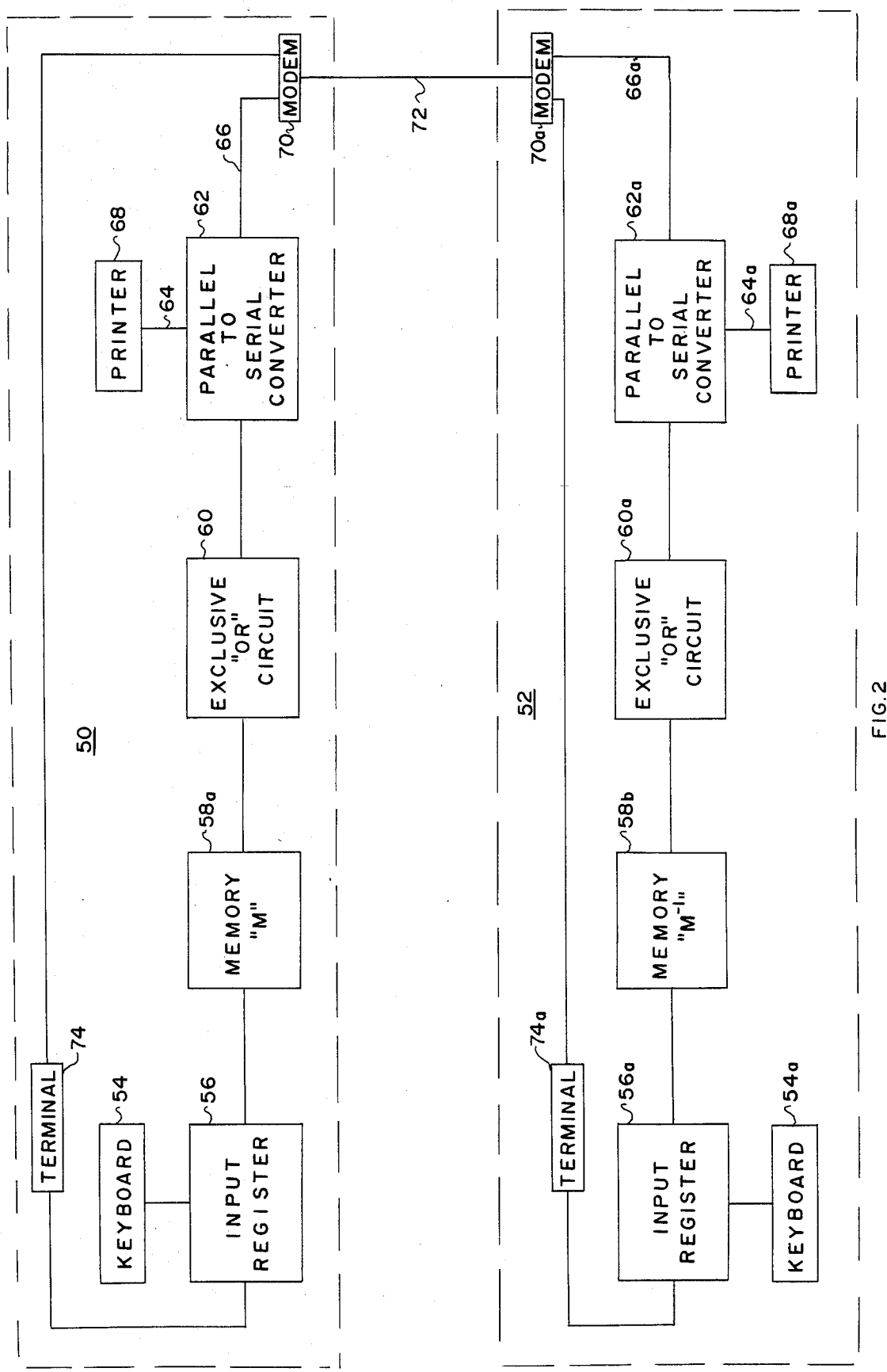
FIG. 2 is a schematic block diagram of a transmission system employing the invention.

FIG. 2 illustrates a two-way communications system in which binary data is transmitted between two communications stations 50 and 52, and wherein the encryption system illustrated in FIG. 1 is employed at both stations. Significantly, a single unit embodying the invention functions to both encode a message to be sent and to decode a message received, with the significant advantage that data is uniquely encrypted in each direction, thus halving the value of any surreptitious intercepts. As an example, the data to be processed is illustrated as having been generated by a keyboard at each station, and by the term keyboard, it is meant a device having a typewriter-like keyboard which provides binary encoded electrical outputs of alpha-numeric characters. Thus, considering station 50, a keyboard 54 furnishes binary bits reflecting letters and/or numbers, and these binary bits are supplied to input shift register 56 serially in sets as described for the loading of input shift register 18 of FIG. 1. While not particularly shown in FIG. 2, keyboard 54 would include appropriate circuitry such as illustrated by buffer memory 22 and clock 24 of FIG. 1 to appropriately interface keyboard 54 with input register 56. The essential thing is that the binary data generated by keyboard 54 is read into input register 56 in like numbered bit sets to the capacity of input register 56, in this case, 64 bit sets.

Assuming a conventional eight-bit-per-character binary encoding by keyboard 54 is used, this would mean that input register 56 would process out eight binary encoded characters (numbers or letters) per operation. In each operation, the 64 binary bits in input register 56 would, as described with respect to FIG. 1, gate out discrete bits stored in memory 58a which, as described with respect to FIG. 1, contains a matrix M of binary bits. The gating operation is as has been described wherein certain column oriented binary bits from memory 58a are processed and provided as an output through exclusively OR circuit 60, operating in a manner described for exclusively OR circuit 30 of FIG. 1. The modulo 2 outputs are thus provided in a parallel fashion to parallel-to-serial converter 62 which, operating as described for output shift register 32 of FIG. 1 (one example of a parallel-to-serial converter), provides as an output, on output leads 64 and 66, an encrypted version of the binary bits supplied to input register 56 from keyboard 54. Lead 64 couples the output to a standard computer-type printer 68, which is adapted to print out alpha-numeric characters on the same binary bit basis as produced by keyboard 54. Printer 68 is normally inoperative during the described encryption mode of operation for station 50, it normally being employed when a message is being received by station 50 and a message, as will be described, is being decrypted.

Lead 66 feeds the output of parallel-to-serial converter 62 to modem 70, which converts between the "0"-"1" electrical value of binary data and telephone line compatible signals for transmission, typically providing one tone frequency signal for a "0" and another tone frequency signal for a "1". Modem 70 then supplies the thus converted signals to telephone line 72, which transmits the signals to a like modem 70a at station 52. Modem 70a then conventionally converts the tone signals back to conventional "0" and "1" amplitude voltage signals and supplies the same to a computer terminal 74a. Computer terminal 74a, having a counterpart at station 50, includes an appropriate buffer memory and clock arrangement, as described above with respect to buffer memory 22 and clock 24 (FIG. 1), as needed to load the data received from station 50, in 64 bit sets, to input register 56a in a manner as described above for loading from keyboard 54 of station 50 into input register 56. Thus, input register 56a would receive and process binary bits in the same manner as described for input register 18 of FIG. 1. In this case, of course, instead of the 64 binary bits being a direct encryption of keyboard input, as described with respect to station 50, the 64 bit sets are encrypted versions of the 64 bit sets of data derived from keyboard 54 of station 50.

As a feature of this invention, decryption of the encrypted data is effected in the same electrical fashion as described for encryption, but the decryption key of memory 58b is a matrix conforming to the inverse of matrix M of memory 58a of station 50 and is designated $M^{-1}$. Decryption follows the same process as encryption and where selected outputs of memory 58b are fed through an exclusively OR circuit 60a, like that of exclusive OR circuit 30 of FIG. 1 and 60 of FIG. 2.

The output of exclusive OR circuit 60a is converted from parallel-to-serial form by parallel-to-serial converter 62a, a device like that of parallel-to-serial converter 62 of station 50. The output of parallel-to-serial converter 62a is the decrypted version of the encrypted output of station 50, and therefore a recreation of the binary encoded data originally generated by keyboard 54 of station 56.

In order to provide a readout of the decrypted text, an output of parallel-to-serial converter 62a is fed on lead 64a to printer 68a, a device like printer 68 of station 50, and printer 68a prints out the text of the original message.

Where a message is to be originated at station 52, keyboard 54a, like that of keyboard 54 of station 50, is employed to provide binary encoded sets of binary data to input register 56a, and input register 56a interrogates memory 58b to encrypt binary data in terms of the matrix $M^{-1}$ and to supply it via exclusive OR circuit 60a to parallel-to-serial converter 62a. From it, it is fed via modem 70a, telephone line 72, and modem 70a to input terminal 74, and as described for terminal 74a, the received data is sequentially fed in sets of binary bits to input register 56. In this case, the matrix M stored in memory 58a performs a decryption function inasmuch as matrix M, reciprocally, is the inverse of matrix $M^{-1}$ of memory 58b. From this point on, the output of memory 58a is processed through exclusive OR circuit 60 in the manner previously described and is fed through parallel-to-serial converter 62 to printer 68, which prints out the original message from keyboard 54a of station 52 in clear or plain text.

From the foregoing, it is to be appreciated that the present invention provides a simple but most efficient system of encrypting and decrypting sets of binary data bits. The number of electrical operations needed to effect encryption and decryption is reduced to a point where operation is extremely fast, yet at the same time the security of the system is vastly improved over currently known block or polygraphic systems. For example, the current government and industry block encryption standard (DES) provides for only $2^{56}$ keys, whereas with the 64×64 matrix described herein (which can be readily increased to a 128×128 matrix), the number of possible keys increases to $2^{2,096}$. The circuitry elements, basic logic components, are cheap and reliable, and component count is quite low. With a low cost of fabrication, the present system can be afforded by a much increased number of users. Significantly, it is particularly applicable to the burgeoning field of electronic transferance of funds between banks. Typically, such transfers must be handled very fast in view of costly computer time involved and, of course, must be absolutely secure as large sums of money are often involved.

The circuitry of the embodiments of the invention illustrate particular means for the shifting, storing, and logic processing of binary data. It is to be appreciated that other binary logic components are available which function in an analagous manner to provide the same functions. For example, instead of employing shift registers for memory 10 and for input and output shift registers 18 and 32 (and their counterparts in FIG. 2), it is to be appreciated that other type devices, including a variety of memory devices, may be employed for these purposes.

The system shown in FIG. 2 is particularly adapted to a system where either there is a single station 1 and a single station 2 which communicate regularly, or where there is a single station 50 and a group of stations 52. For those instances where any station must communicate with any other station, then each station would employ both a memory M, designated 58a, and a memory $M^{-1}$, designated 58b. Then, switches would be employed whereby, for transmission, one of these memories would be employed, and for reception, the other would be employed.

I claim:

1. A binary encryption/decryption system comprising:
    buffer storage means having a selected plurality of ordered binary storage locations, and responsive to a series of binary state input signals, for selectively and temporarily storing, in order of appearance, sets of said series of input signals in correspondingly ordered storage locations;
    key storage means comprising:
        a plurality of binary signal memory locations, and there being stored therein an invertible binary matrix of ordered rows and columns having a common row and column origin, and
        readout means, including a plurality of row oriented sets of electronic gating means, one set for each row of memory locations, each electronic gating means of a set being coupled to a separate memory location of the same row, and being responsive to a selected state of binary signal control input for gating to an output the binary state of the memory location to which the gate is coupled;
    coupling means for supplying the signal state of each discretely ordered storage location of said buffer storage means, as a control input, to a row oriented discrete set of electronic gating means for a said row of said matrix, whereby, where said selected signal state is present in one of said ordered storage locations of said buffer storage means, the signal state of a coordinately ordered row of said matrix appears across the outputs of a said set of electronic gating means, and where a non-selected state exists, the gating means of a coordinate set of electronic gating means for a row of said matrix each provides a like state output and do not, together, gate out the signal states of a row of memory locations as outputs;
    a set of row oriented exclusively OR logic circuit means, each said logic circuit means being responsive to a column oriented set of outputs of said electronic gating means for providing, in a selected order, an ordered set of modulo 2 character output signals; and
    signal means responsive to successively following sets of said ordered output signals for providing said last-named output signals as a series of sets of binary output signals;
    whereby sets of said ordered series of binary state input signals are translated, in mass, into encrypted sets of a like ordered series of binary state output signals.

2. A communications system comprising:

first and second communications stations;

communications signal transmission means for the transmission of first signals from said first station to said second station and for transmission of said second signals from said second station to said first station;

said first and second stations each comprising:

buffer storage means having a selected plurality of ordered binary storage locations, and responsive to a series of binary state input signals, including signals derived from said communications signal transmission means, for selectively and temporarily storing, in order of appearance, successive sets of said series of input signals in correspondingly ordered storage locations, key storage means comprising:

a plurality of binary signal memory locations, and there being stored therein an invertible binary matrix of ordered rows and columns having a common row and column origin, and readout means including a plurality of row oriented sets of electronic gating means, one set for each row of memory locations, each electronic gating means of a set being coupled to a separate memory location of the same row, and being responsive to a selected state of binary signal control input, for gating to an output the binary state of the memory location to which the gate is coupled, coupling means for supplying the signal state of each discretely ordered storage location of said buffer storage means, as a control input, to a row oriented discrete set of electronic gating means for a said row of said matrix, whereby, where said selected signal state is present in one of said ordered storage locations of said buffer storage means, the signal states of a coordinately ordered row of said matrix appears across outputs of a said set of electronic gating means, and, where a non-selected state exists, each gating means of a coordinate set of electronic gating means for a row of said matrix provides a like state output, and do not, together, gate out the signal states of a row of memory locations as outputs;

a set of row oriented exclusively OR logic circuit means, each said logic circuit means being responsive to a column oriented set of outputs of said electronic gating means for providing, in a selected order, an ordered set of modulo 2 character output signals, and signal means responsive to successively following said ordered set of modulo 2 character output signals for providing said last-named output signals as a series of sets of binary output signals to said communication means; and said invertible matrix of said key storage means of said first station is the inverse of said invertible matrix of said key storage means of said second station.

* * * * *